United States Patent
Hoshino

(10) Patent No.: US 9,930,261 B2
(45) Date of Patent: Mar. 27, 2018

(54) IMAGE GENERATING APPARATUS, IMAGE GENERATING METHOD AND COMPUTER READABLE RECORDING MEDIUM FOR RECORDING PROGRAM FOR GENERATING NEW IMAGE FROM IMAGES RELATED TO REFERENCE IMAGE

(71) Applicant: CASIO COMPUTER CO., LTD., Shibuya-ku, Tokyo (JP)

(72) Inventor: Hiroyuki Hoshino, Hamura (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 13 days.

(21) Appl. No.: 14/827,434

(22) Filed: Aug. 17, 2015

(65) Prior Publication Data

US 2016/0057359 A1 Feb. 25, 2016

(30) Foreign Application Priority Data

Aug. 19, 2014 (JP) .................................. 2014-166818

(51) Int. Cl.
*H04N 5/232* (2006.01)
*G06K 9/46* (2006.01)
(Continued)

(52) U.S. Cl.
CPC ....... *H04N 5/23293* (2013.01); *G06K 9/4604* (2013.01); *G06K 9/6202* (2013.01);
(Continued)

(58) Field of Classification Search
CPC ................................................ H04N 5/23293
(Continued)

(56) References Cited

U.S. PATENT DOCUMENTS

| 9,036,943 B1* | 5/2015 | Baldwin | G06K 9/00664 |
| | | | 382/103 |
| 2005/0051725 A1* | 3/2005 | Nakagaki | G01N 23/04 |
| | | | 250/311 |

FOREIGN PATENT DOCUMENTS

| JP | 09-190546 | 7/1997 |
| JP | 2006-080632 | 3/2006 |

(Continued)

OTHER PUBLICATIONS

Japanese Office Action for Japanese Patent Application No. 2014-166818 dated Oct. 27, 2015.

*Primary Examiner* — Joel Fosselman
(74) *Attorney, Agent, or Firm* — Amin, Turocy & Watson LLP; Gregory Turocy

(57) ABSTRACT

In an image generating apparatus according to an embodiment of the present invention, the reference image selecting unit selects an image as a reference image. The image extracting unit extracts at least one related image related to the reference image. The image generating unit generates a new composite image by using the reference image and the at least one related image according to a layout including a definition of at least one kind of information selected from a group including a background image, the number of images to be used, a size of each image to be used, and positional relation among images to be used. The basic control unit issues an instruction to make the reference image selecting unit select an image being displayed as the reference image and make the image generating unit generate the new composite image based on the reference image.

15 Claims, 7 Drawing Sheets

(51) Int. Cl.
*G06K 9/62* (2006.01)
*H04N 5/262* (2006.01)
*H04N 5/272* (2006.01)

(52) U.S. Cl.
CPC ......... *H04N 5/2621* (2013.01); *H04N 5/2625* (2013.01); *H04N 5/272* (2013.01)

(58) Field of Classification Search
USPC ........................................................ 348/239
See application file for complete search history.

(56) References Cited

FOREIGN PATENT DOCUMENTS

| | | |
|---|---|---|
| JP | 2008-217479 | 9/2008 |
| JP | 2011-198225 | 10/2011 |
| JP | 2013-109578 | 6/2013 |
| JP | 2013-131811 | 7/2013 |

\* cited by examiner

FIG. 6

(PROCEDURE 5)

| | N-3 | N-2 | N-1 | N | N+1 | N+2 | N+3 | | |
|---|---|---|---|---|---|---|---|---|---|
| INTERVAL TIME (SEC) | 61 | 477 | 58 | 0 | 61 | 58 | 60 | TOTAL INTERVAL TIME | TOTAL SEPARATION TIME |
| SEPARATION TIME (SEC) | 596 | 535 | 58 | 0 | 61 | 119 | 179 | | |
| THIRD SELECTION PATTERN | | | N-1 | N | N+1 | N+2 | | 177 | 238 |
| FOURTH SELECTION PATTERN | | | | N | N+1 | N+2 | N+3 | 179 | 359 |
| SECOND SELECTION PATTERN | | N-2 | N-1 | N | N+1 | | | 596 | 654 |
| FIRST SELECTION PATTERN | N-3 | N-2 | N-1 | N | | | | 596 | 1189 |

(PROCEDURE 6)

| | M-3 | M-2 | M-1 | M | M+1 | M+2 | M+3 | | |
|---|---|---|---|---|---|---|---|---|---|
| INTERVAL TIME (SEC) | 58 | 61 | 58 | 0 | 60 | 59 | 60 | TOTAL INTERVAL TIME | TOTAL SEPARATION TIME |
| SEPARATION TIME (SEC) | 177 | 119 | 58 | 0 | 60 | 119 | 179 | | |
| THIRD SELECTION PATTERN | | | M-1 | M | M+1 | M+2 | | 177 | 237 |
| SECOND SELECTION PATTERN | | M-2 | M-1 | M | M+1 | | | 179 | 237 |
| FIRST SELECTION PATTERN | M-3 | M-2 | M-1 | M | | | | 177 | 354 |
| FOURTH SELECTION PATTERN | | | | M | M+1 | M+2 | M+3 | 179 | 358 |

IMAGE GENERATING APPARATUS, IMAGE GENERATING METHOD AND COMPUTER READABLE RECORDING MEDIUM FOR RECORDING PROGRAM FOR GENERATING NEW IMAGE FROM IMAGES RELATED TO REFERENCE IMAGE

CROSS-REFERENCE TO RELATED APPLICATIONS

This application is based upon and claims the benefit of priority under 35 USC 119 of Japanese Patent Application No. 2014-166818 filed on Aug. 19, 2014, the entire disclosure of which is incorporated herein by reference in its entirety for all purposes.

BACKGROUND OF THE INVENTION

1. Field of the Invention

The present invention relates to an image generating apparatus, an image generating method and a computer readable recording medium recording a program thereon.

2. Description of the Related Art

Conventionally, a technique called a collage has been known as a method for making use of images taken by a digital camera.

The collage is a method for generating a new image by designing arrangements such as sizes, positions or angles of a plurality of images and attaching them on a background image, thereby improving visual effect. In general, a user can make and enjoy a collage image or post it on the web to make the public enjoy it.

As an example of technologies relating to the collage, Japanese Patent Application Laid-Open Publication No. 2006-80632 published on Mar. 23, 2006 discloses a technology for relatively easily generating a composite image by laying out a plurality of images selected by a user.

SUMMARY OF THE INVENTION

According to an embodiment of the present invention, an image generating apparatus is provided. The image generating apparatus includes an image selecting section configured to select an image as a reference image, an extracting section configured to extract at least one related image which is related to the reference image selected by the image selecting section, a generating section configured to generate a new composite image by using the reference image selected by the image selecting section and the at least one related image extracted by the extracting section according to a layout, the layout comprising a definition of at least one kind of information selected from a group comprising a background image, the number of images to be used to generate a composite image, a size of each image to be used to generate a composite image, and positional relation among images to be used to generate a composite image, and an instructing section configured to issue an instruction to make the image selecting section select an image which is being displayed on a display screen as the reference image and make the generating section generate the new composite image based on the selected reference image.

According to an embodiment of the present invention, an image generating method performed by an image generating apparatus is provided. The image generating method includes selecting an image as a reference image, extracting at least one related image which is related to the selected reference image, generating a new composite image by using the selected reference image and the extracted at least one related image according to a layout, the layout comprising at least one definition of information selected from a group comprising a background image, the number of images to be used to generate a composite image, a size of each image to be used to generate a composite image, and positional relation among images to be used to generate a composite image, and issuing an instruction to select an image which is being displayed on a display screen as the reference image and generate the new composite image based on the selected reference image.

According to an embodiment of the present invention, a non-transitory computer-readable recording medium for recording a program readable by a computer is provided. The program controls the computer to execute functions including an image selecting function of selecting an image as a reference image, an extracting function of extracting at least one related image which is related to the reference image selected by the image selecting function, a generating function of generating a new composite image by using the reference image selected by the image selecting function and the at least one related image extracted by the extracting function according to a layout, the layout comprising at least one definition of information selected from a group comprising a background image, the number of images to be used to generate a composite image, a size of each image to be used to generate a composite image, and positional relation among images to be used to generate a composite image, and an instructing function of issuing an instruction to make the image selecting function select an image which is being displayed on a display screen as the reference image and making the image generating function generate the new composite image based on the selected reference image.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention will more sufficiently be understood by the following detailed description and the accompanying drawings, which are, however, exclusively for explanation and do not limit the scope of the present invention.

Here:

FIG. 1A shows a state in which a rear surface unit 1B is in a standard position and FIG. 1B shows a state in which the rear surface unit 1B is rotated about a hinge.

FIG. 6 is a schematic diagram showing an example of a process for extracting an image group executed by the image extracting unit 52.

DETAILED DESCRIPTION OF THE PREFERRED EMBODIMENT

Hereinafter, embodiments of the present invention will be described with reference to the accompanying drawings.

Figure 1A:
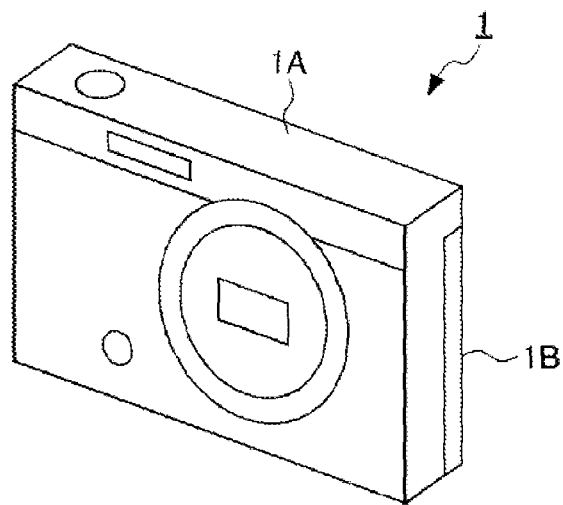
FIGS. 1A and 1B are schematic diagrams showing exterior features of an image generating apparatus according to an embodiment of the present invention.
Figure 1B:
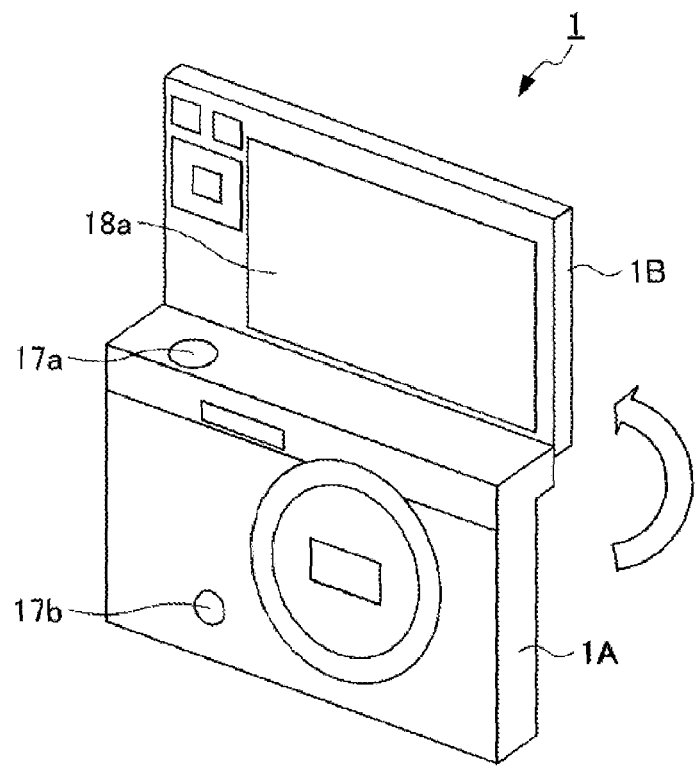

FIGS. 1A and 1B are schematic diagrams showing exterior features of an image generating apparatus 1 according to an embodiment of the present invention. FIG. 1A shows a state in which a rear surface unit 1B is in a standard position and FIG. 1B shows a state in which the rear surface unit 1B is rotated about a hinge.

Figure 2:
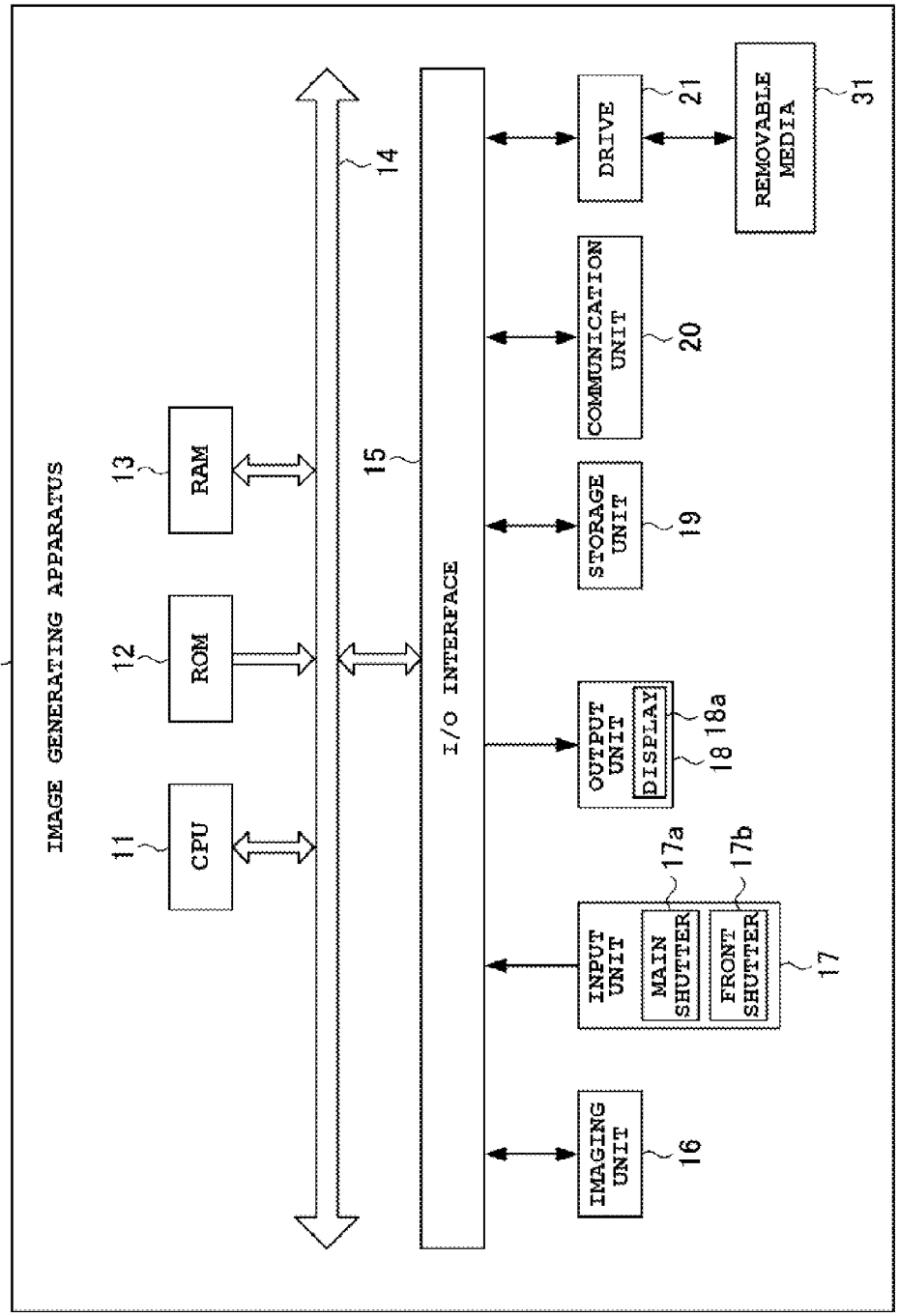
FIG. 2 is a block diagram showing a hardware configuration of an image generating apparatus according to an embodiment of the present invention.

FIG. 2 is a block diagram showing a hardware configuration of the image generating apparatus 1 according to an embodiment of the present invention.

For example, the image generating apparatus 1 is realized by a digital camera. In the present embodiment, the image generating apparatus 1 includes a main body 1A and the rear surface unit 1B forming a rear surface of the main body 1A. The rear surface unit 1B is rotatably connected to the main body 1A by the hinge.

The image generating apparatus 1 includes a CPU (Central Processing Unit) 11, a ROM (Read Only Memory) 12, a RAM (Random Access Memory) 13, a bus 14, an I/O interface 15, an imaging unit 16, an input unit 17, an output unit 18, a storage unit 19, a communication unit 20, and a drive 21.

The CPU 11 executes various processes according to programs stored in the ROM 12 or loaded in the RAM 13 from the storage unit 19.

In the RAM 13, there are stored data necessary for the CPU 11 to execute various processes, and the like.

The CPU 11, the ROM 12 and the RAM 13 are connected to each other via the bus 14. The I/O interface 15 is also connected to the bus 14. The imaging unit 16, the input unit 17, the output unit 18, the storage unit 19, the communication unit 20, and the drive 21 are connected to the I/O interface 15.

The imaging unit 16 includes an optical lens unit and an image sensor (not shown in the drawing).

The optical lens unit includes lenses for collecting light to photograph a subject such as a focus lens and a zoom lens.

The focus lens forms an image of a subject on a light-receiving surface of the image sensor. The zoom lens freely changes the focal length within a predetermined range.

Further, the optical lens unit is provided with a peripheral circuit to adjust parameters such as focusing, exposure, and/or white balancing, as necessary.

The image sensor includes a photoelectric conversion element, an AFE (Analog Front End), and the like.

The photoelectric conversion element includes a CMOS (Complementary Metal Oxide Semiconductor) type photoelectric conversion element, for example. A subject's image is input to the photoelectric conversion element from the optical lens unit. The photoelectric conversion element performs photoelectric conversion (image capturing) of the subject's image and accumulates image signals for a predetermined period of time. The photoelectric conversion element provides the AFE with the accumulated image signals sequentially.

The AFE executes various signal processing operations such as A/D (Analog/Digital) conversion on the analog image signals. Digital signals are generated by the signal processing operations and output as output signals of the imaging unit 16.

The output signal of the imaging unit 16 is hereinafter referred to as "a captured image". The captured image is supplied to the CPU 11.

The input unit 17 includes a touch panel stacked on a display 18a of the output unit 18 and a variety of information is input via the input unit 17 in response to manipulation by a user. The touch panel may be a contact type or a non-contact type. Further, in addition to the touch panel, the input unit 17 includes various buttons including a main shutter button 17a and a front shutter button 17b for inputting a variety of information in response to manipulation by the user. In the present embodiment, the main shutter button 17a is provided on the top surface of the image generating apparatus 1 and the front shutter button 17b is provided on a front surface of the image generating apparatus 1 (i.e. a surface from which the optical lens unit protrudes). In the case that the image generating apparatus 1 is in a shooting mode for shooting an image, both of the main shutter button 17a and the front shutter button 17b function as a shutter button for instructing to shoot an image. In the case that the image generating apparatus 1 is in a playback mode for playing the shot image back, the main shutter button 17a functions as a direct button for instructing to switch to the shooting mode for shooting an image and the front shutter button 17b functions as a direct button for instructing to execute a process for easily generating a collage image (a direct collage mode which will be described later).

The output unit 18 includes a display 18a, a speaker, or the like, and outputs images or voices. In the present embodiment, a body rear surface of the image generating apparatus 1 is formed by the rear surface unit 1B which is different from the main body 1A. The rear surface unit 1B includes the display 18a and is connected to the main body 1A by the hinge with a rotation axis along an upper edge of the body rear surface. Thus, the display 18a stands alongside the body rear surface in a state of standard usage for taking a snapshot or a landscape picture (see FIG. 1A) and the rear surface unit 1B is rotated about the hinge and the display 18a stands alongside a body front surface in a state of special usage for taking a self-portrait, for example (see FIG. 1B).

The storage unit 19 includes a hard disk, a DRAM (Dynamic Random Access Memory), or the like and various image data is stored therein.

The communication unit 20 controls communication with different devices (not shown in the drawing) via a network such as Internet.

A removable media 31 including a magnetic disk, an optical disk, a magneto-optical disc, a semiconductor memory, or the like, is mounted on the drive 21. A program read out from the removable media 31 by the drive 21 is installed in the storage unit 19 as necessary. Similarly to the storage unit 19, the removable media 31 stores various data such as the image data stored in the storage unit 19.

Figure 3:
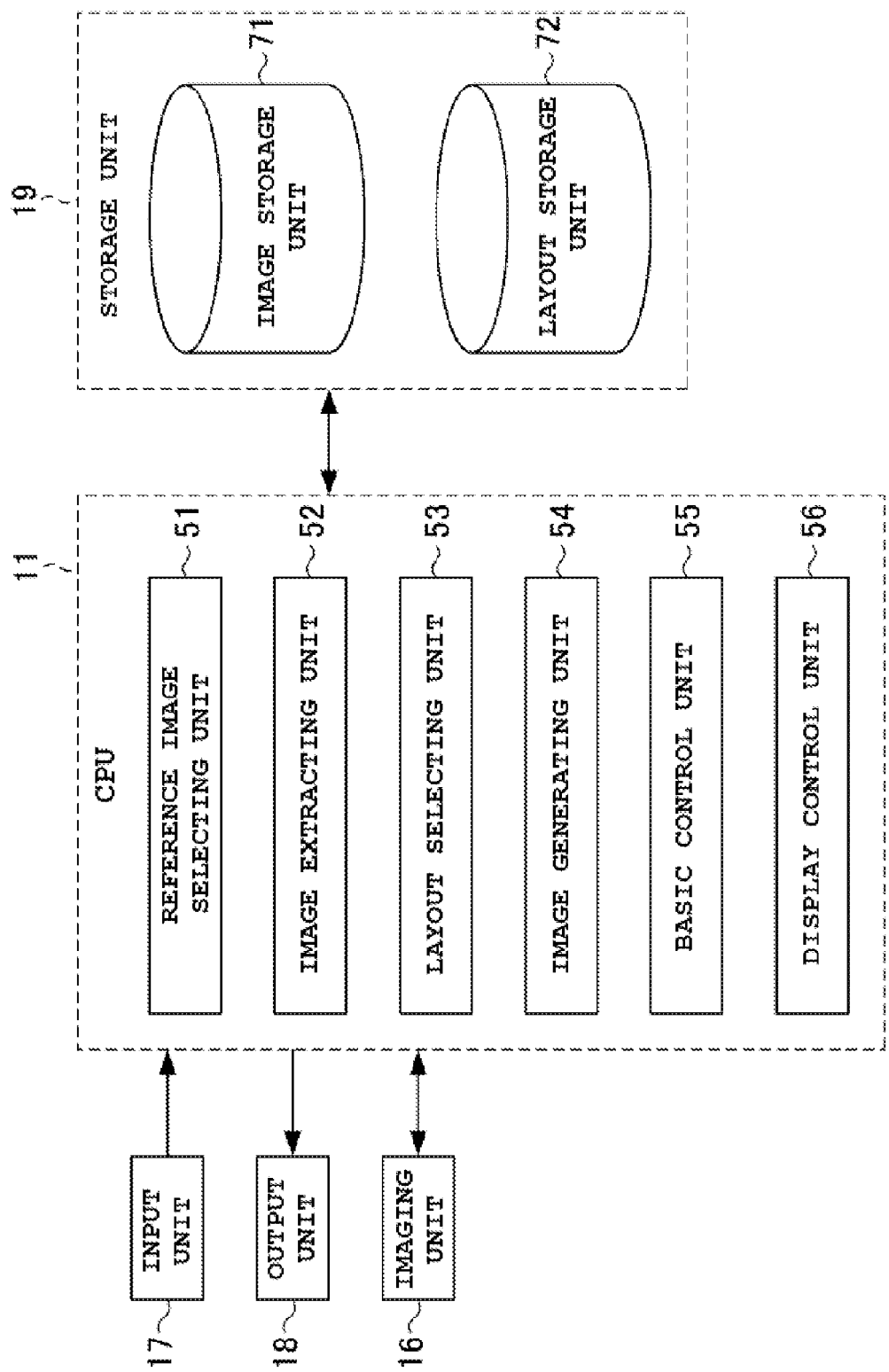
FIG. 3 is a functional block diagram showing a functional configuration of the image generating apparatus for executing an image generation process.

FIG. 3 is a functional block diagram showing a functional configuration of the image generating apparatus 1 for executing an image generation process.

The image generation process means a series of actions taken in order to select a reference image and the other images automatically or manually from a plurality of images and generate one image (a collage image) by laying out the selected images.

In the case of executing the image generation process, a reference image selecting unit 51, an image extracting unit 52, a layout selecting unit 53, an image generating unit 54, a basic control unit 55, and a display control unit 56 of the CPU 11 function.

In an area of the storage unit 19, an image storage unit 71 and a layout storage unit 72 are configured.

In the image storage unit 71, there is stored data of images which will be used for generation of a collage image in the image generation process. The data stored in the image storage unit 71 can be data of images shot by the image generating apparatus 1 or data input from a different device, for example.

In the layout storage unit 72, there is stored data of layouts which will be used for generation of a collage image in the image generation process.

Figure 4:
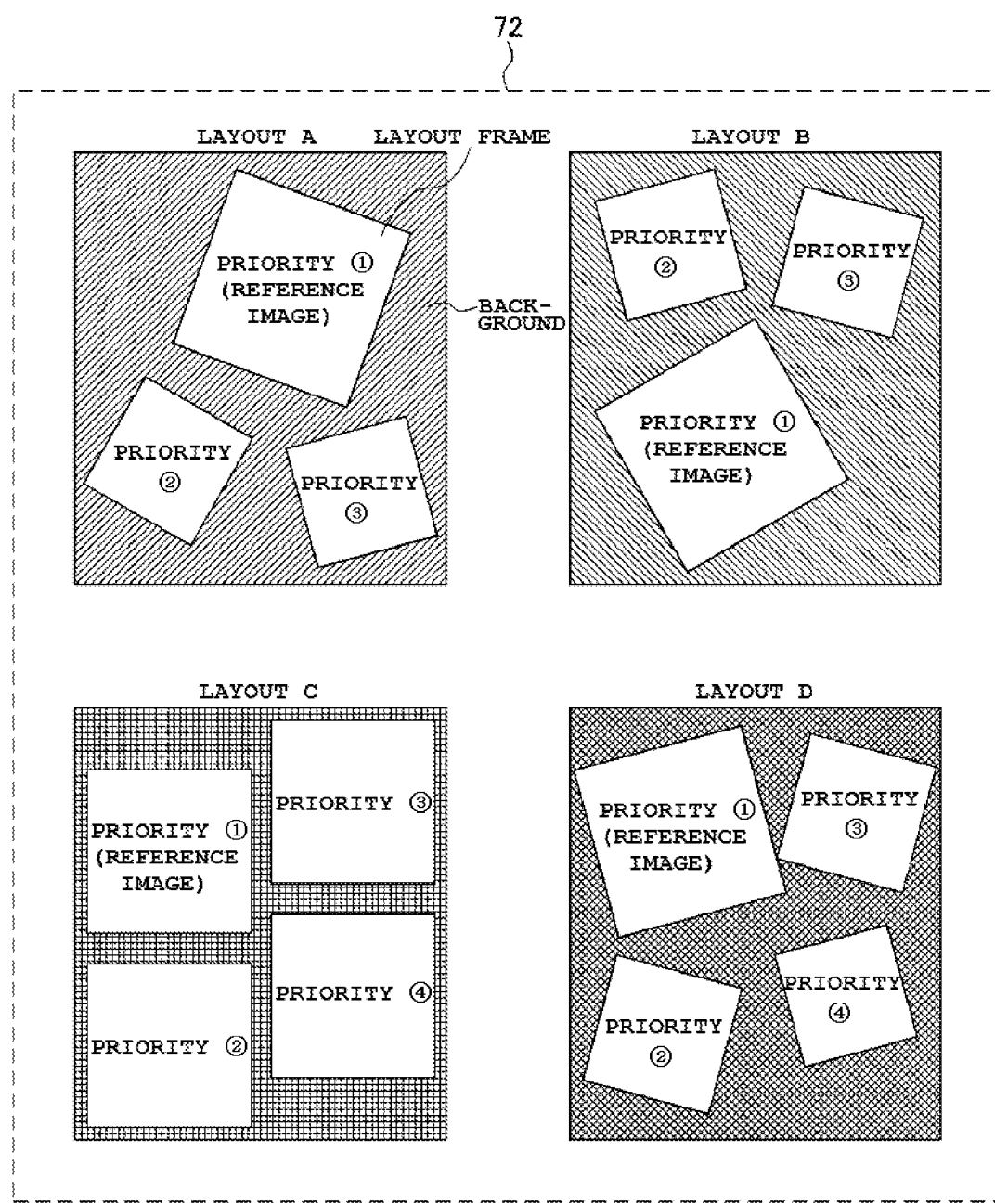
FIG. 4 is a schematic diagram showing exemplary layouts.

FIG. 4 is a schematic diagram showing exemplary layouts. In FIG. 4, four layouts stored in the layout storage unit 72 (layouts A to D) are shown as an example.

As shown in FIG. 4, a layout is a template including layout frames into which a predetermined number of images including a reference image are inserted and a background image. For each layout, the number of layout frames (i.e. the number of images forming a collage image) is set. For each of the layout frames, positional relation (central positions), priorities, sizes and rotation angles of images to be inserted are set. In the present embodiment, a "main layout frame" having the highest priority is a layout frame having the biggest size. A priority of a layout frame different from the main layout frame is higher if it is positioned in the left side and in the upper side. For generation of a collage image, a reference image is disposed in the main layout frame and the other images are disposed in descending order of temporal relationship to the reference image (which will be described later) in the layout frames in descending order of priority. The data of layouts stored in the layout storage unit 72 are prepared beforehand.

The reference image selecting unit 51 selects an image which will be a reference for generation of a collage image (the reference image). In the present embodiment, two kinds of modes for generation of a collage image are available, i.e. a first quick collage mode in which a reference image to be used for the collage image is automatically selected and a second quick collage mode in which the reference image to be used for the collage image is manually selected. In the case that the first quick collage mode is selected, the reference image selecting unit 51 automatically selects an image which is being displayed by the display 18a as the reference image. In the case that the second quick collage mode is selected, the reference image selecting unit 51 designates an image which the user manually selects as the reference image. Further, in the present embodiment, a direct collage mode which simplifies the user's manipulation in the first quick collage mode is also available. In the case that the front shutter button 17b is manipulated in the playback mode, the image generating apparatus 1 is switched to the direct collage mode. In the direct collage mode, selection of a layout by the layout selecting unit 53 is automatically performed in addition to the selection of the reference image by the reference image selecting unit 51. In the direct collage mode according to the present embodiment, the reference image selecting unit 51 automatically selects an image which is being displayed by the display 18a as the reference image and the layout selecting unit 53 automatically selects a layout used for a collage image generated last time.

The image extracting unit 52 acquires time-related information of each image. More specifically, the image extracting unit 52 acquires the shooting date (year-month-date) and time of the reference image in seconds.

Further, the image extracting unit 52 extracts an image group to be used for generation of the collage image with the reference image based on the temporal relationship to the reference image. More specifically, according to the number of layout frames of the selected layout, the image extracting unit 52 acquires a group of images temporally adjacent with the reference image as the center (for example, in the case that the number of layout frames is four, total seven images consisting of the reference image, three images older than the reference image and three images newer than the reference image) from the image storage unit 71. In other words, the image extracting unit 52 acquires a series of images with the reference image as the center by acquiring an image group consisting of the set number of images (for example, four images) of which shooting time is close to that of the reference image in which the reference image is the newest image, an image group consisting of the set number of images of which shooting time is close to that of the reference image in which the reference image is the second to the newest, an image group consisting of the set number of images of which shooting time is close to that of the reference image in which the reference image is the third to the newest, and an image group consisting of the set number of images of which shooting time is close to that of the reference image in which the reference image is the oldest image.

Further, the image extracting unit 52 calculates interval time and separation time from the acquired shooting date and time of the series of images. The interval time is a difference in shooting time between two adjacent images and the separation time is a difference in shooting time between the reference image and each of other image(s). The image extracting unit 52 calculates a total interval time (the sum of interval time) and a total separation time (the sum of separation time) for each of the image groups.

The image extracting unit 52 calculates the total interval time and the total separation time for each of the image groups included in the series of images and extracts an image group having the closest temporal relationship to the reference image from the image groups based on the total interval time and the total separation time. In the present embodiment, the image extracting unit 52 extracts an image group having the lowest total separation time as an image group having the closest temporal relationship to the reference image. In the case that at least two image groups have the lowest total separation time, the image extracting unit 52 extracts an image group having the lowest total interval time from all of the image groups as an image group having the closest temporal relationship to the reference image. In the case that at least two image groups have the lowest total interval time, the image extracting unit 52 extracts an image group including the oldest image from all of the image groups as an image group having the closest temporal relationship to the reference image. An image group selected as above is used for generation of the collage image.

Figure 5:
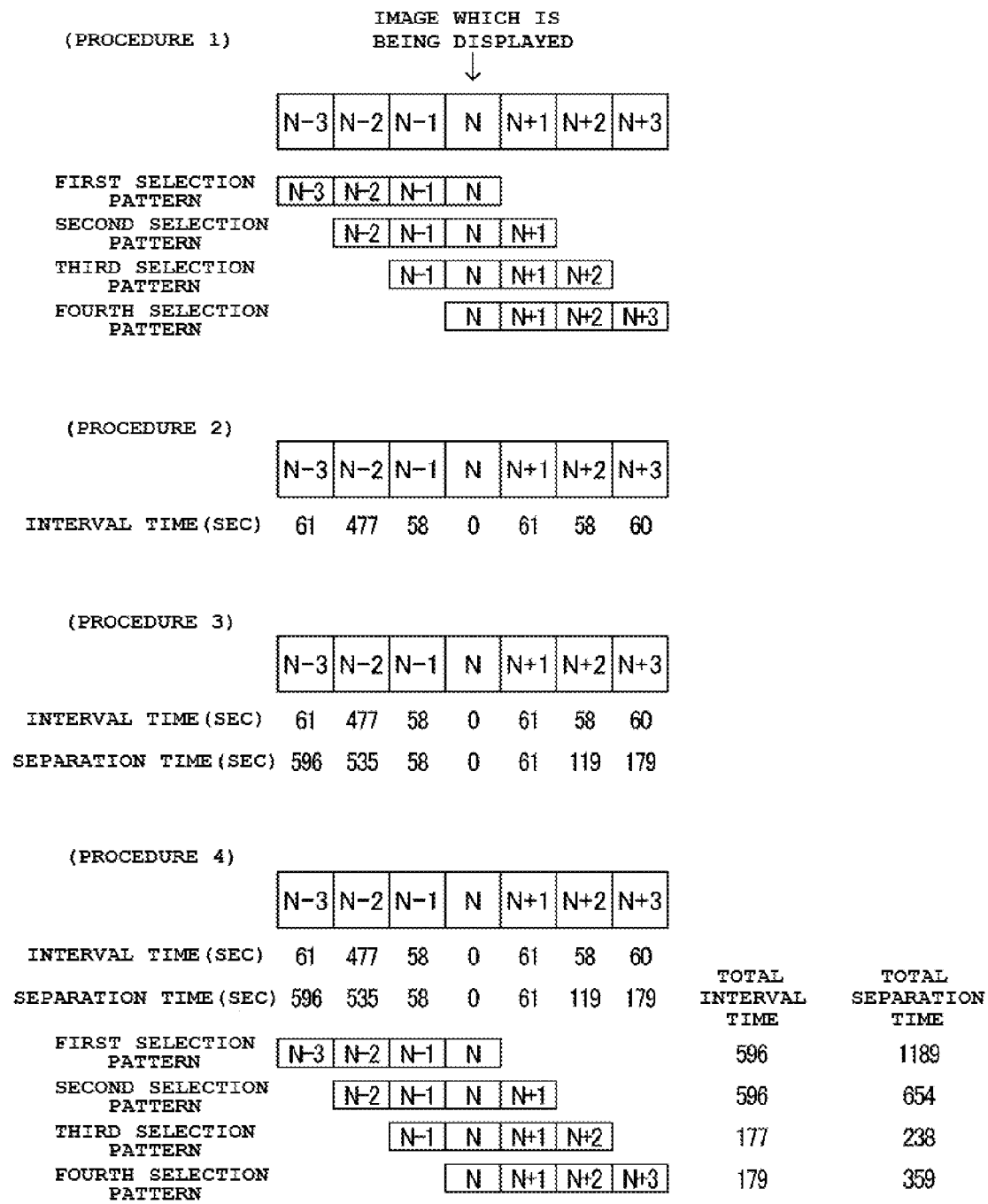
FIG. 5 is a schematic diagram showing an example of a process for extracting an image group executed by an image extracting unit 52.

FIGS. 5 and 6 are schematic diagrams showing exemplary processes for extracting an image group executed by an image extracting unit 52. In FIGS. 5 and 6, each of N and M is a natural number indicating a number of each image.

As shown in FIGS. 5 and 6, in the case that a collage image is generated by using four images including a reference image, total seven images consisting of the reference image, three images older than the reference image and three images newer than the reference image are read from the image storage unit 71 into the RAM 13 by referring to shooting date and time of each image (Procedure 1). For the seven images, first to fourth selection patterns can be considered as image groups each of which includes four adjacent images.

Then, for the seven images read at Procedure 1, interval time is calculated (Procedure 2).

Then, separation time from the shooting date and time of the reference image is calculated from the interval time calculated at Procedure 2 (Procedure 3).

Then, from the interval time calculated at Procedure 2 and the separation time calculated at Procedure 3, a total interval time and a total separation time are calculated for each of the selection patterns (Procedure 4).

After that, the total separation time calculated at Procedure 4 is sorted in ascending order of value and a selection pattern having the lowest total separation time is extracted as an image group having the closest temporal relationship to the reference image (Procedure 5).

In the case that seven images are read based on a reference image of which shooting date and time is different and at least two selection patterns have the lowest total separation time at Procedure 5, the total interval time calculated at Procedure 4 is sorted in ascending order of value and a selection pattern having the lowest total interval time is extracted as an image group having the closest temporal relationship to the reference image (Procedure 6).

By the above procedures, it is possible to easily extract images which the user wants to use from a plurality of images.

Returning to FIG. 3, the layout selecting unit 53 selects a layout which the user manually selects as a layout to be used for generation of a collage image in the first quick collage mode and the second quick collage mode. Further, in the direct collage mode, the layout selecting unit 53 automatically selects a layout which was previously selected for generation of a collage image. For example, the layout selecting unit 53 automatically selects the layout selected for the collage image generated last time as a layout to be used for generation of a new collage image. Alternatively, in the direct collage mode, the user may designate a default layout which is automatically selected.

The image generating unit 54 generates a collage image by disposing the reference image selected by the reference image selecting unit 51 and the images of the image group extracted by the image extracting unit 52 in the layout frames of the layout selected by the layout selecting unit 53. The image generating unit 54 disposes the reference in the main layout frame and the other images in descending order of temporal relationship to the reference image (i.e. in descending order of proximity of shooting time) in the remaining layout frames in descending order of priority. Further, the image generating unit 54 changes the size, the central position and the rotation angle of each image according to a layout frame corresponding to the image and then disposes it in the layout frame. Thus, one collage image is generated from the reference image, the images of the image group and the layout.

The basic control unit 55 executes basic control processes such as a process of generating a menu screen, processes corresponding to various operations selected from the menu screen, and processes corresponding to manipulation of various buttons included in the input unit 17.

The display control unit 56 executes control the display 18*a* to display various images and the menu screen for the image generation process. For example, the display control unit 56 controls the display 18*a* to display reference image candidates sequentially or a list of layout candidates. Further, the display control unit 56 controls the display 18*a* to display the collage image generated by the image generating unit 54.

Figure 7:
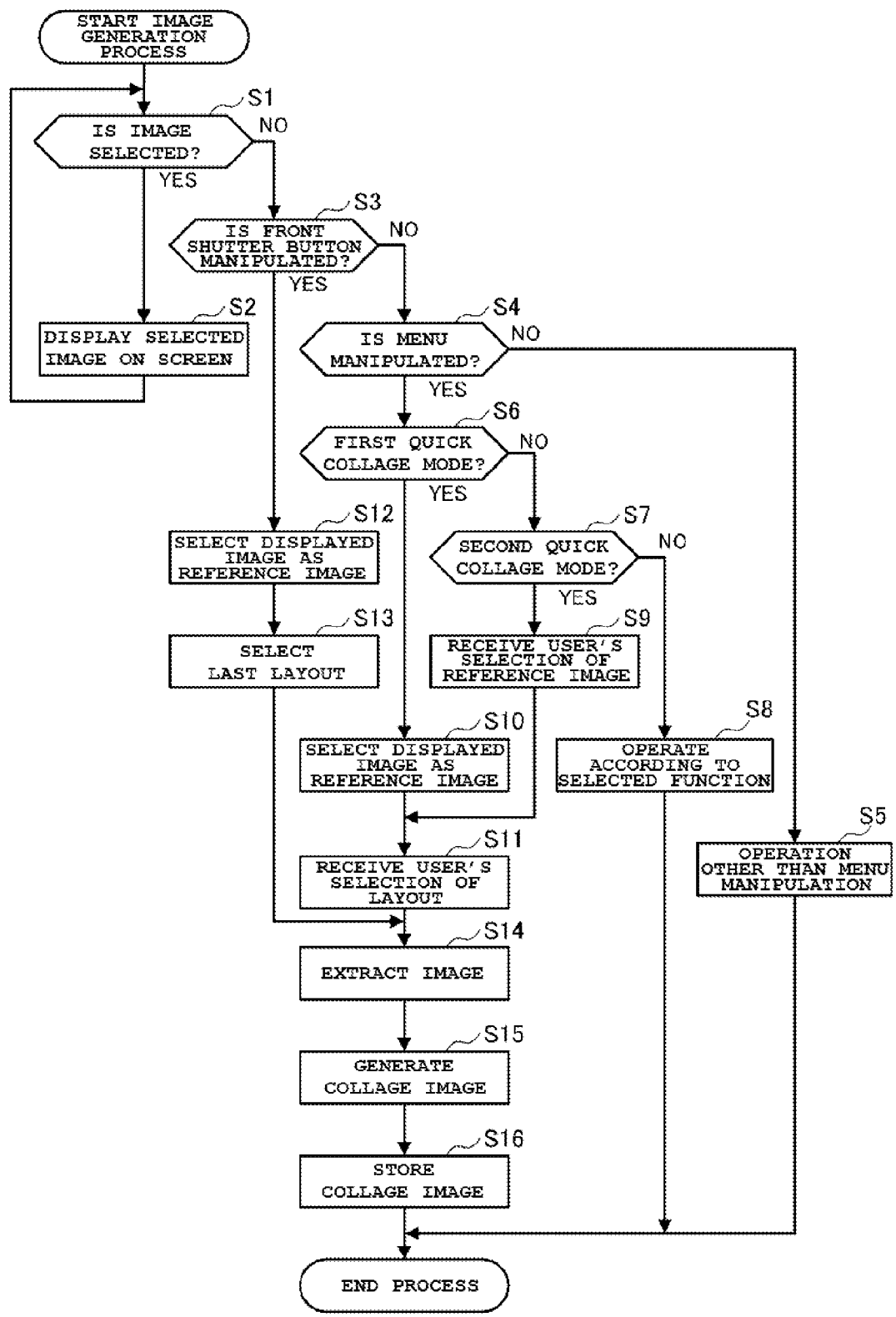
FIG. 7 is a flow chart for explaining the image generation process executed by the image generating apparatus shown in FIGS. 1A and 1B including the functional configuration shown in FIG. 3.

FIG. 7 is a flow chart for explaining the image generation process executed by the image generating apparatus 1 shown in FIGS. 1A and 1B including the functional configuration shown in FIG. 3.

Upon switching the image generating apparatus 1 to the playback mode by manipulation of the input unit 17 and displaying images stored in the image storage unit 71, the image generation process is started.

At Step S1, the basic control unit 55 determines whether or not a user performs an operation of selecting one of images displayed on a display screen.

In the case that the user performs the operation of selecting one of the images displayed on the display screen, the determination at Step S1 is "YES" and the process proceeds to Step S2.

On the other hand, in the case that the user does not perform the operation of selecting one of the images displayed on the display screen, the determination at Step S1 is "NO" and the process proceeds to Step S3.

At Step S2, the basic control unit 55 displays the selected image on the display screen.

At Step S3, the basic control unit 55 determines whether or not the front shutter button 17*b* is manipulated.

In the case that the front shutter button 17*b* is not manipulated, the determination at Step S3 is "NO" and the process proceeds to Step S4.

On the other hand, in the case that the front shutter button 17*b* is manipulated, the determination at Step S3 is "YES" and the process proceeds to Step S12.

At Step S4, the basic control unit 55 determines whether or not a menu manipulation is performed.

In the case that no menu manipulation is performed, the determination at Step S4 is "NO" and the process proceeds to Step S5.

On the other hand, in the case that the menu manipulation is performed, the determination at Step S4 is "YES" and the process proceeds to Step S6.

At Step S5, the basic control unit 55 executes operations other than the menu manipulation such as switch to the shooting mode.

After Step S5, the image generation process ends.

At Step S6, the basic control unit 55 determines whether or not the user selects the first quick collage mode.

In the case that the first quick collage mode is not selected by the user, the process proceeds to Step S7.

In the case that the first quick collage mode is selected by the user, the process proceeds to Step S10.

At Step S7, the basic control unit 55 determines whether or not the user selects the second quick collage mode.

In the case that the second quick collage mode is not selected by the user, the process proceeds to Step S8.

In the case that the second quick collage mode is selected by the user, the process proceeds to Step S9.

At Step S8, the basic control unit 55 executes an operation according to a function selected by the menu manipulation (such as copy of an image or a slide show).

After Step S8, the image generation process ends.

At Step S9, the reference image selecting unit 51 receives the user's selection of a reference image. Here, an image selected by the user is designated as the reference image by the reference image selecting unit 51.

After Step S9, the process proceeds to Step S11.

At Step S10, the reference image selecting unit 51 selects an image which is being displayed by the display 18a as the reference image.

At Step S11, the layout selecting unit 53 receives the user's selection of a layout from a selecting operation which the user performs in a selection screen in which a list of thumbnails showing layouts is displayed. Here, the layout selected by the user is designated as a layout to be adopted for a collage image by the layout selecting unit 53. The display type of the selection screen is not limited to the list of thumbnails and may be a list of names indicating the layouts.

At Step S12, the reference image selecting unit 51 selects an image which is being displayed by the display 18a as the reference image.

At Step S13, the layout selecting unit 53 selects the layout selected for the collage image generated last time as a layout to be used for generation of a collage image.

At Step S14, the image extracting unit 52 extracts one or more images to be used for generation of the collage image. More specifically, the image extracting unit 52 acquires time-related information of each image. Further, based on the time-related information of each image, the image extracting unit 52 acquires a series of images temporally adjacent with the reference image as the center from the image storage unit 71. Further, the image extracting unit 52 calculates interval time and separation time from the shooting date and time of the acquired series of images. The image extracting unit 52 also calculates a total interval time and a total separation time for each of image groups included in the series of images. The image extracting unit 52 extracts an image group having the closest temporal relationship to the reference image from the image groups based on the total interval time and the total separation time.

At Step S15, the image generating unit 54 generates a collage image by disposing the reference image selected by the reference image selecting unit 51 and the remaining image(s) of the image group extracted by the image extracting unit 52 in layout frames of the layout selected by the layout selecting unit 53.

At Step S16, the image generating unit 54 allows the generated collage image to be stored in the image storage unit 71.

After Step S16, the image generation process ends.

According to the process described above, in the case that the user sets the image generating apparatus 1 to the first quick collage mode, an image which is being displayed by the display 18a is selected as the reference image and an image group having close temporal relationship to the reference image is automatically extracted. Further, a collage image is generated by disposing the reference image and the remaining image(s) of the image group in a layout selected by the user.

Therefore, it is possible to easily generate an effective image from a plurality of images.

Further, in the direct collage mode, in the case that the user manipulates the front shutter button 17b when an image is being displayed by the display 18a, the image which is being displayed by the display 18a is selected as the reference image and an image group having close temporal relationship to the reference image is automatically extracted without the user's menu manipulation. In addition, the layout used for the collage image generated last time is automatically selected and a new collage image is generated by disposing the reference image and the remaining image (s) of the image group in the layout.

Thus, it is possible to reduce the user's effort to select a group of images and/or a layout and generate an effective image from a plurality of images more easily.

(Modification 1)

In the above embodiments, an image group to be used for generation of a collage image with a reference image is extracted based on the temporal relationship to the reference image. Alternatively, it is possible to determine relationship between each image and the reference image based on a factor other than time.

More specifically, relationship between an image and the reference image can be determined based on subjects of the images.

For example, it is possible to extract an image group to be used for generation of a collage image from images including a subject the same as the face of a subject included in the reference image.

In this case, the image extracting unit 52 detects the face of the subject included in the reference image and acquires images including a face the same as the face of the subject included in the reference image from the image storage unit 71. Further, the image extracting unit 52 extracts an image group having close temporal relationship to the reference image from the acquired images.

Thus, it is possible to simply generate a collage image consisting of a reference image and other image(s) including the same subject as that of the reference image.

Further, it is also possible to determine relationship to the reference image based on a shooting location of each image as a factor other than time.

For example, it is possible to extract an image group to be used for generation of a collage image from images shot at locations relatively close to a location at which the reference image is shot.

In this case, information on a shooting location may be added to each image by using a positioning technology such as the GPS (Global Positioning System). The image extracting unit 52 acquires the shooting location of each image and determines that an image shot at a location closer to the location at which the reference image is shot has closer relationship to the reference image.

Thus, it is possible to simply generate a collage image consisting of a reference image and images shot at locations close to a location at which the reference image is shot.

(Modification 2)

According to another modification of the above embodiments, one or more images shot within a predetermined period of time (for example, within one hour) before or after shooting time of a reference image are extracted and a layout is automatically selected according to the number of extracted image(s). A layout similar to that used for the collage image generated last time can be automatically selected. More specifically, layouts can be classified into groups by kinds of background and/or positional relation of layout frames and a layout can be automatically selected from a group including the layout used for the collage image generated last time.

Thus, it is possible to reduce the user's effort to select a group of images and/or a layout and generate a collage image more simply.

(Modification 3)

In the above embodiments, an image group is extracted to generate a collage image with a reference image based on the temporal relationship to the reference image. According to another modification of the above embodiments, the temporal relationship is determined for every year or every month. In other words, after masking information on year or month, the temporal relationship is determined on a monthly or shorter basis or a daily or shorter basis. Thus, images in the same period of time of every year or every month are determined to have close temporal relationship.

Thus, it is possible to simply generate a collage image consisting of images of an event shot at the same time of every year or every month (for example, a birthday party or a monthly presentation).

(Modification 4)

According to another modification of the above embodiments, a layout is automatically selected according to the number of images to be used for a collage image. In other words, the layout selecting unit 53 may automatically select one or more layouts having layout frames of the number corresponding to the number of images included in the image group extracted by the image extracting unit 52.

Thus, it is possible to reduce the user's effort to select a layout and generate a collage image more simply.

The image generating apparatus 1 configured as described above includes the reference image selecting unit 51, the image extracting unit 52, the image generating unit 54, and the basic control unit 55.

The reference image selecting unit 51 selects an image as the reference image.

The image extracting unit 52 extracts at least one related image which is related to the reference image selected by the reference image selecting unit 51.

The image generating unit 54 generates a new composite image by using the reference image selected by the reference image selecting unit 51 and the at least one related image extracted by the image extracting unit 52 according to a layout. The layout includes a definition of at least one kind of information selected from a group including a background image, the number of images to be used to generate a composite image, a size of each image to be used to generate a composite image, and positional relation among images to be used to generate a composite image.

The basic control unit 55 issues an instruction to make the reference image selecting unit 51 select an image which is being displayed on a display screen as the reference image and make the image generating unit 54 generate the new composite image based on the selected reference image.

Thus, it is possible to automatically select a reference image and one or more other images to generate a new image such as a composite image.

Therefore, it is possible to generate an effective image from a plurality of images more easily.

The image generating apparatus 1 includes the layout selecting unit 53.

In some embodiments, the layout selecting unit 53 selects a layout according to a user's manipulation.

By this, it is possible to an effective image from a plurality of images more easily by using a layout selected by the user.

In some embodiments, the layout selecting unit 53 selects a layout selected for a composite image generated last time in the case that an instruction to generate the new composite image is issued by the basic control unit 55.

By this, it is possible to reduce the user's effort to select a layout and generate an effective image from a plurality of images more easily.

In some embodiments, the image extracting unit 52 extracts at least one related image based on the number of images to be used to generate a composite image. The definition of the number of images to be used to generate a composite image is included in the layout selected by the layout selecting unit 53.

By this, since a proper number of images can be automatically extracted, it is possible to generate an effective image from a plurality of images more easily.

In some embodiments, the layout selecting unit 53 selects a layout according to the number of related images extracted by the image extracting unit 52.

By this, it is possible to automatically select a layout according to the number of related images which are related to the reference image.

In some embodiments, the layout selecting unit 53 gives priority to a layout similar to that selected for a composite image generated last time when selecting a layout.

By this, it is possible to reduce the user's effort to select a layout and generate an effective image from a plurality of images more easily.

In some embodiments, the image generating apparatus includes a playback mode.

In the playback mode, an image to be displayed by the display may change to another image while an image of a plurality of images is being displayed by the display.

The basic control unit 55 issues an instruction to make the image generating unit 54 generate a new composite image while the image change is being performed in the playback mode.

By this, in the case that a desired image is being displayed by the display 18a, the user can instruct the image generating unit 54 to generate a composite image. Thus, it is possible to easily generate an effective image.

In some embodiments, while an image is being displayed in the playback mode, generation of the new composite image is performed by the image generating unit 54 in the case that an instruction to generate the new composite image is issued. Further, a changed image is displayed without the generation of the new composite image being performed by the image generating unit 54 in the case that an instruction to change the image being displayed is issued.

By this, the user can easily instruct generation of a new image while referring to changed images.

In some embodiments, the image generating apparatus 1 includes a shooting mode.

In the shooting mode, it is possible to shoot an image.

The basic control unit 55 operates in response to manipulation of the front shutter button 17b functioning as a means for issuing an instruction to generate a new composite image in the playback mode and a means for issuing an instruction to shoot an image in the shooting mode.

By this, it is possible to allow the front shouter button 17b, which functions as a shutter button at the time of image shooting, to function as a means for issuing an instruction to generate a new image. Thus, it is possible to improve manipulability for the user.

In some embodiments, the basic control unit 55 operates in response to manipulation of one of a plurality of means for instructing image shooting included in the image generating apparatus (i.e. the main shutter button 17a and the front shutter button 17b).

By this, it is possible to allow one of a plurality of shutter buttons to function as a means for instructing generation of a new image. Thus, it is possible to improve manipulability for the user.

In some embodiments, the basic control unit 55 issues an instruction to perform generation of a new composite image by manipulation of a manipulating unit installed on a predetermined location of the body of the image generating apparatus 1.

By this, the user can issue an instruction to generate a new image by simple manipulation.

In some embodiments, the image extracting unit 52 extracts at least one related image based on time-related information included in the reference image.

By this, since at least one image having close temporal relationship to the reference image can be extracted, it is possible to extract more suitable images.

In some embodiments, the image extracting unit 52 extracts at least one related image based on location information included in the reference image.

By this, since at least one image having closely related in location to the reference image can be extracted, it is possible to extract more suitable images.

In some embodiments, the image extracting unit 52 recognizes a subject in an image and extracts at least one related image based on the recognized subject.

By this, since at least one image of which subject is closely related to that of the reference image can be extracted, it is possible to extract more suitable images.

In addition, the present invention is not limited to the embodiments described above and various modifications and alternatives which can achieve the objects of the invention fall within the scope of the present invention.

In the embodiments described above, the layout defines spatial arrangement but the present invention is not limited to these embodiments. According to an embodiment of the present invention, a layout defines temporal arrangement.

For example, the present invention can be applied to the case in which a reference image is selected as described above with respect to the embodiments, one or more images related to the reference image are automatically extracted, and one moving picture is generated from the reference image and the extracted image(s).

In this case, the layout frame of the layout of the above embodiments may correspond to an order of arrangement of the images on the time axis and the background of the layout may correspond to a pattern of effect for connecting images.

Further, in the embodiments described above, the present invention has been applied to generation of a collage image by a plurality of images including a reference image. However, the present invention is not limited to these embodiments. The present invention can be applied to various things other than images. For example, the present invention may be applied to various contents such as documents or music.

In the embodiments described above, the total separation time takes priority over the total interval time when determining the temporal relationship between the reference image and an image group. However, the present invention is not limited to these embodiments. According to certain embodiments, the total interval time may take priority over the total separation time or only one of the total separation time and the total interval time may be used. Further, in the embodiments described above, the total separation time or the total interval time is a simple addition of the values of the separation time or the values of the interval time. However, according to certain, embodiments, the sum of the square of the values of the separation time or the sum of the square of the values of the interval time may be used. Further, if the product of the values of the separation time or the product of the values of the separation time for an image group is smaller, the image group may be determined to have closer relationship to the reference image.

Further, in the embodiments described above, the present invention has been applied to a digital camera as an example of the image generating apparatus 1 without limitation.

For example, the present invention can be applied to general electronic devices having the function of image processing. More specifically, the present invention can be applied to a notebook type personal computer, a printer, a television, a video camera, a portable navigation device, a mobile phone, a smart phone, a portable game device, and the like.

The process sequence described above can be executed by hardware or software.

In other words, the functional configuration shown in FIG. 3 is merely an example and the present invention is not limited thereto. The image generating apparatus 1 suffices if it has a function for performing the process sequence as a whole. Functional blocks to use to implement this function are not limited to the embodiment of FIG. 3.

In addition, a functional block may be configured by a piece of hardware, a piece of software, or their combination.

In the case that the sequence is performed by software, a program configuring the software is installed in a computer or the like from a network or a storage medium.

The computer may be a computer which is incorporated in dedicated hardware. In addition, the computer may be a computer capable of executing various functions by installing various programs therein, for example, a general-purpose personal computer.

A storage medium for recording such a program consists of not only the removable media 31 shown in FIG. 2 which is distributed separately from the apparatus's main body to provide it to users, but also a storage medium or the like which is provided to users in a state of being incorporated in the apparatus's main body in advance. The removable media 31 includes, for example, a magnetic disk (including a floppy disk), an optical disc, a magneto-optical disk, or the like. For example, the optical disc includes a compact disk-read only memory (CD-ROM), a digital versatile disk (DVD), a Blu-ray (Registered Trademark) disc, or the like. The magneto-optical disk includes a Mini-Disk (MD), or the like. In addition, the storage medium which is provided to the users in a state of being incorporated in the apparatus's main body in advance includes, for example, the ROM 12 in FIG. 2 in which a program is recorded, a hard disk included in the storage unit 19 in FIG. 2, or the like.

Further, in the description presented here, the steps describing a program recorded in a recording medium include not only processes to be executed serially in time in order, but also processes which are not necessarily executed serially in time but in a parallel manner or individually.

Although some embodiments of the present invention have been described above, the embodiments are for illustrative purposes only and not intended to limit the technical scope of the present invention. It will be evident that there are many other possible embodiments of the present invention and various modifications such as omission or substitution may be made without departing from the spirit of the invention. These embodiments and modifications fall within the scope and the spirit of the invention described in this specification and within the scope of the invention as defined in the appended claims and equivalents thereof.

What is claimed is:

1. An image generating apparatus comprising:
a memory in which one or more programs are stored; and
a processor,
wherein the one or more computer programs cause the processor to perform operations to:
select an image as a reference image from a plurality of images;
select a most recent layout selected for a composite image generated most recently as a layout for a new composite image;

extract at least one related image from the plurality of images, which is related to the reference image selected from the plurality of images, by selecting the at least one related image from the plurality of images; and generate the new composite image different according to the selected reference image, by using the selected reference image and the extracted at least one related image based on a layout, the layout comprising a definition of at least one kind of information of a background image, the number of images to be used to generate the composite image, a size of each image to be used to generate the composite image, and positional relation among images to be used to generate the composite image.

2. The image generating apparatus of claim 1, wherein the processor performs the operation to generate the new composite image based on a layout selected according to a user's manipulation.

3. The image generating apparatus of claim 1, wherein the processor performs the operation to extract the at least one related image based on the number of images to be used to generate the composite image, the definition of the number of images to be used to generate the composite image being comprised in the layout.

4. The image generating apparatus of claim 1, wherein the processor performs the operation to extract the at least one related image based on time-related information comprised in the reference image.

5. The image generating apparatus of claim 1, wherein the processor performs the operation to extract the at least one related image based on location information comprised in the reference image.

6. The image generating apparatus of claim 1, wherein the processor further performs an operation to recognize a subject in the selected reference image, and the processor performs the operation to extract the at least one related image based on the recognized subject.

7. The image generating apparatus of claim 1, further comprising an instructing unit,
wherein, according to one instruction to generate the new composite image issued by the instructing unit, the processor performs a series of operations to:
select an image as a reference image from the plurality of images;
extract the at least one related image from the plurality of images, which is related to the selected reference image, by selecting the at least one related image from the plurality of images; and
generate the new composite image different according to the selected reference image, by using the selected reference image and the extracted at least one related image based on a layout, the layout comprising a definition of at least one kind of information of the background image, the number of images to be used to generate a composite image, a size of each image to be used to generate the composite image, and positional relation among images to be used to generate the composite image, the new composite image being different according to the selected reference image.

8. The image generating apparatus of claim 7, wherein the processor performs an operation to select a layout to be used when generating the new composite image as a part of the series of operations according to the one instruction to generate the new composite image.

9. The image generating apparatus of claim 1, further comprising a display unit for displaying an image of the plurality of images,
wherein the processor performs the operation to select an image which is being displayed by the display unit as the reference image.

10. An image generating apparatus, comprising:
an instructing unit;
a display unit;
a memory in which one or more programs are stored; and
a processor,
wherein, according to an instruction to generate a new composite image issued by the instructing unit, the one or more computer programs cause the processor to perform operations to:
select an image as a reference image;
extract at least one related image which is related to the selected reference image; and
generate the new composite image by using the selected reference image and the extracted at least one related image based on a layout, the layout comprising a definition of at least one kind of information of a background image, the number of images to be used to generate a composite image, a size of each image to be used to generate the composite image, and positional relation among images to be used to generate the composite image,
the image generating apparatus has a playback mode where an image to be displayed by the display unit is changed to another image while an image of a plurality of images is being displayed by the display unit, and the instructing unit issues the instruction to generate the new composite image at arbitrary timing while the image change is being performed in the playback mode, and
while an image is being displayed in the playback mode, the processor performs the operation to generate the new composite image in the case that the instructing unit issues the instruction to generate the new composite image, and a changed image is displayed without the generation of the new composite image being performed in the case that the instructing unit issues an instruction to change the image being displayed.

11. An image generating apparatus, comprising:
an instructing unit;
a display unit;
a memory in which one or more programs are stored; and
a processor,
wherein, according to an instruction to generate a new composite image issued by the instructing unit, the one or more computer programs cause the processor to perform operations to:
select an image as a reference image;
extract at least one related image which is related to the selected reference image; and
generate the new composite image by using the selected reference image and the extracted at least one related image based on a layout, the layout comprising a definition of at least one kind of information of a background image, the number of images to be used to generate a composite image, a size of each image to be used to generate the composite image, and positional relation among images to be used to generate the composite image,
the image generating apparatus has a playback mode where an image to be displayed by the display unit is changed to another image while an image of a plurality of images is being displayed by the display unit, and the instructing unit issues the instruction to generate the new composite image at arbitrary timing while the image change is being performed in the playback mode, the image generating apparatus has a shooting mode where an image is shot, and the instructing unit issues the instruction to generate the new composite image in the playback mode and issues an instruction to shoot an image in the shooting mode.

12. The image generating apparatus of claim 11 further comprising a plurality of units which instruct image shooting, wherein the instructing unit is one of the plurality of units.

13. The image generating apparatus of claim 11, wherein the instructing unit issues the instruction to generate the new composite image according to manipulation of a manipulating unit installed on a predetermined location of a body of the image generating apparatus.

14. An image generating method performed by an image generating apparatus comprising:

selecting an image as a reference image from a plurality of images;

selecting a most recent layout selected for a composite image generated most recently as a layout for a new composite image;

extracting at least one related image from the plurality of images, which is related to the reference image selected from the plurality of images, by selecting the at least one related image from the plurality of images; and generating the new composite image different according to the selected reference image, by using the selected reference image and the extracted at least one related image based on a layout, the layout comprising at least one definition of information of a background image, the number of images to be used to generate a composite image, a size of each image to be used to generate the composite image, and positional relation among images to be used to generate the composite image.

15. An image generating method performed by an image generating apparatus, which comprises a display unit and an instructing unit, comprising:

according to an instruction to generate a new composite image issued by the instructing unit, selecting an image as a reference image;

extracting at least one related image which is related to the selected reference image; and generating the new composite image by using the selected reference image and the extracted at least one related image based on a layout, the layout comprising a definition of at least one kind of information of a background image, the number of images to be used to generate a composite image, a size of each image to be used to generate the composite image, and positional relation among images to be used to generate the composite image, wherein the image generating apparatus has a playback mode where an image to be displayed by the display unit is changed to another image while an image of a plurality of images is being displayed by the display unit, and the instructing unit issues the instruction to generate a new composite image at arbitrary timing while the image change is being performed in the playback mode, and while an image is being displayed in the playback mode, the new composite image is generated in the case that the instructing unit issues the instruction to generate the new composite image, and a changed image is displayed without the generation of the new composite image being performed in the case that the instructing unit issues an instruction to change the image being displayed.

* * * * *